Patented Apr. 27, 1954

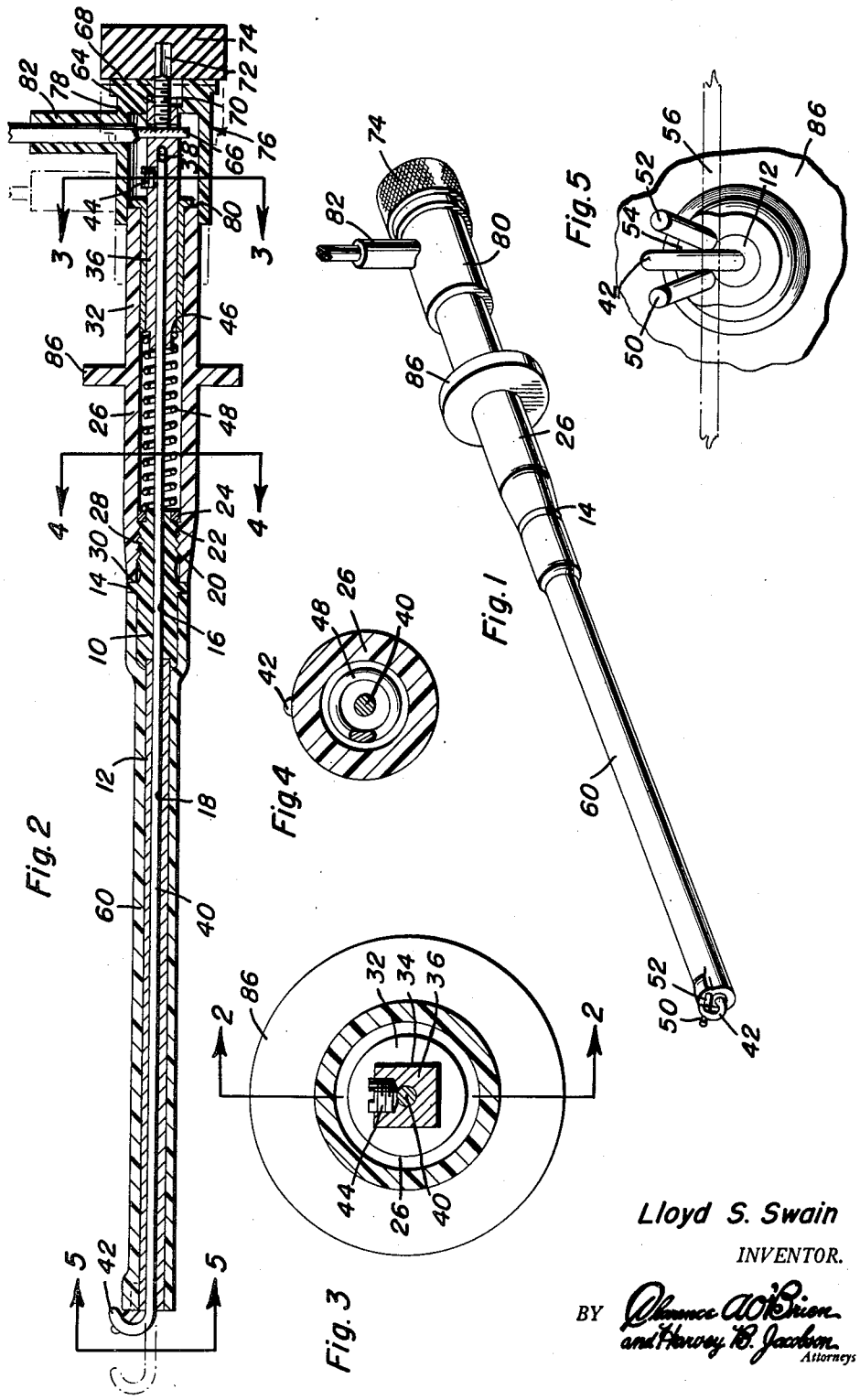

2,677,117

UNITED STATES PATENT OFFICE 2,677,117

TEST PROD

Lloyd S. Swain, Martinsville, Va., assignor of one-half to Kathleen R. Swain, Martinsville, Va.

Application April 30, 1952, Serial No. 285,347

4 Claims. (Cl. 339—110)

This invention relates to a test prod and particularly to a prod to be attached to or detached from and firmly locked on to conductors and to electronic devices for testing or examining the same.

In the testing and maintenance of electronic devices such as radios, television sets and other electronic devices, it is necessary to be able to determine the operative condition of various circuits in the device. Also, it is frequently necessary to trace the circuits to determine at what portion of the circuit an accident has occurred.

The present invention provides a prod having an extremely small diameter and a firm fast lock for attachment to conductors within the instrument. The prod comprises a cylindrical body member having an insulated coating thereon and a movable hook-like member for engaging a conductor or wire in the set or instrument undergoing test and having fingers with which the hook acts to firmly lock the prod on the wire. A conductor is connected to the prod in insulated relation and the size and shape of the prod is such that it may be hooked on to a wire and left in position while the operator performs other tasks without the danger of the prod jumping or being jarred loose from the connection.

It is accordingly an object of this invention to provide an improved test prod.

It is a further object of the invention to provide a test prod having a firm engaging tip.

It is a further object of the invention to provide a test prod having a completely insulated structure.

It is a further object of the invention to provide a test prod having a protected connection to the prod.

It is still another object of the invention to provide a test prod which may be conveniently operated and left in position while the operator performs other functions.

Other objects and many of the attendant advantages of the present invention will be apparent from the following detailed description taken in conjunction with the accompany drawing, in which:

Figure 1 is a perspective view of the test prod;

Figure 2 is an enlarged longitudinal section showing the construction of the prod taken substantially on the plane indicated by the line 2—2 of Figure 3;

Figure 3 is an enlarged cross section taken substantially on the plane indicated by the line 3—3 of Figure 2;

Figure 4 is an enlarged cross section taken substantially on the plane indicated by the line 4—4 of Figure 2; and Figure 5 is an enlarged end view of the prod taken substantially on the plane indicated by the line 5—5 of Figure 2.

In the exemplary embodiment of the invention an elongated nut-like base member 10 has rigidly attached to one end thereof a tubular body 12. The base member 10 is provided intermediate the ends thereof with a collar 14. The base 10 is further provided with a longitudinally extending bore 16 which is substantially a continuation of the bore 18 of the tubular base 10. One end of the body 12 is provided with external threads 20 and adjacent the end thereof is provided with a seat 22 on which is mounted a spring seat 24. A substantially tubular handle 26 is provided with internal threads 28 for meshing with the external threads 29 of the base 10 so that the end 30 of the handle 26 can be screwed into firm engagement with the upstanding collar 14 of the base member 10.

The handle 26 is provided at the far end thereof with a guide sleeve 32 which has a square or other non-circular guide channel 34 therein. A connector block 36 is slidably mounted in the guide sleeve 32 for sliding movement in the channel 34. The connector block 36 is provided with an axial bore 38 in which is mounted a wire-like rod 40. The rod 40 extends axially through the handle 26, the base 10 and the body 12 to extend from the remote end of the body 10 where it is provided with a hook-like member 42, the rod 40 being firmly secured to the connector block 36 by means of a set screw 44. The inner end of the connector block 36 is provided with a spring seat 46 and a compression spring 48 is mounted between the seats 24 and 46 to resiliently urge the connecting block 36 outwardly from the handle 26.

The outermost end of the body 12 has connected thereto a pair of fingers 50 and 52 which are firmly secured to the outer surface adjacent the end of the body by any suitable means, such as welding, brazing or soldering and they extend in diverging outwardly flaring relation to provide a V-shaped groove 54 and to which the hook member 42 may be engaged. The spring 48 by urging the connecting bar 36 outwardly will maintain the hook 42 in firm engagement with anything such as a conductor 56 which has been selectively engaged by the hook 42.

An insulating coating 60 is applied to the external portion of the body 20 and extends upwardly over the portion of the fingers 50 and 52 which are connected to the end of the body 12 and also extends upwardly over that portion of the base 10 which is connected to the body 12 and extends outwardly of the body 10 to the annular collar 14 with which it is substantially flush.

The connector block 36 is provided with a transverse opening 64 through which the end of a conductor 66 may be extended. The connector block 36 is also provided with a longitudinal internally threaded bore 68 in which is threadedly engaged a lock screw 70. The lock screw 70 has a non-circular head 72 on which is molded or otherwise connected an insulating thumb screw 74. The conductor 66 is secured in firm relation in the passage 64 by turning the nut 74 to put the set screw 70 in firm engagement with the conductor 66.

An actuating member 76 has a head 78 which is molded or otherwise connected to the end of the connecting block 36 and has a substantially tubular sleeve 80 mounted in sliding telescopic relation with the exterior surface of the handle 26. A reinforcing sleeve 82 extends laterally from one side of the telescoping sleeve 80 and the conductor 66 extends thereto to be reinforced adjacent to its connection to the connector block 42.

An annular disk-like projection 86 is provided intermediate the ends of the handle 26 to provide a firm finger-grip for the operator on the handle of the prod.

In the operation and use of the device the conductor 66 is firmly connected to the connecting block 36 which is, in turn, firmly connected to the rod 40 having the hook 42. The actuating member 76 is depressed between the thumb and finger of the operator so that the hook 42 is free to extend outwardly from the end of the body 12 and may be engaged over any of the conductors in the electronic device. By releasing the pressure between the actuating member 76 and the annular collar 86 the hook 42 will be allowed to move inwardly under the tension of the spring 48 to lock the selected conductor 56 firmly between the hook and the fingers 50 and 52 so that the prod will be in firm locking engagement with the conductor and may be allowed to remain in position while the operator performs other tasks without there being any danger of the prod being jarred loose or otherwise accidentally removed from the conductor 56.

It will thus be seen that there has been provided an effective test prod which may be readily connected with various portions of the equipment under test and left without danger of being jarred or accidentally removed therefrom.

A preferred embodiment of the invention has been shown, and described according to the best present understanding thereof. It will be apparent to those skilled in the art that changes and modifications may be made therein without departing from the true spirit of the invention.

Having described the invention, what is claimed as new is:

1. A test probe comprising an elongated tubular body, a pair of outwardly flaring diverging fingers secured adjacent one end of the body, a wire-like rod slidably mounted in said body, a portion of said rod protruding from said body, a hook on said protruding portion, said hook extending over the outer end of said body and being received between said fingers.

2. A test prod comprising an elongated tubular body, a pair of outwardly flaring diverging fingers secured adjacent one end of the body and extending radially beyond the end of the body, a wire-like rod slidably mounted in said body, a portion of said rod protruding from said body, a hook on said protruding portion, said hook extending beyond the outer end of said body and being received between said fingers, and an insulating coating on said tubular body including the base of said diverging fingers.

3. A test prod comprising an elongated nut-like base, a tubular body rigidly secured on said base, outwardly flaring diverging fingers secured to said body and extending beyond the end thereof, an insulating surface applied to said body and a portion of said base, a rod slidably mounted in said body, a hook on the end of said rod, said hook extending laterally over the end of said body cooperating with said fingers.

4. In a test probe having an elongated tubular body and a spring biased hook rod slidably mounted in said body, a selector terminal comprising a pair of diverging outwardly flaring fingers rigidly mounted on said tubular body, said fingers providing an outwardly flaring V-shaped groove, a hook end on said hook rod, said hook end extending laterally over the end of said body and being received between said fingers.

References Cited in the file of this patent

UNITED STATES PATENTS

| Number | Name | Date |
|---|---|---|
| 2,094,392 | Winslow | Sept. 28, 1937 |
| 2,516,657 | Spendlove | July 25, 1950 |
| 2,529,270 | Webster | Nov. 7, 1950 |